GORDON W. YARBER
KUO T. CHANG
JOSEPH KUKEL
INVENTORS.

BY *[signature]*

ATTORNEY

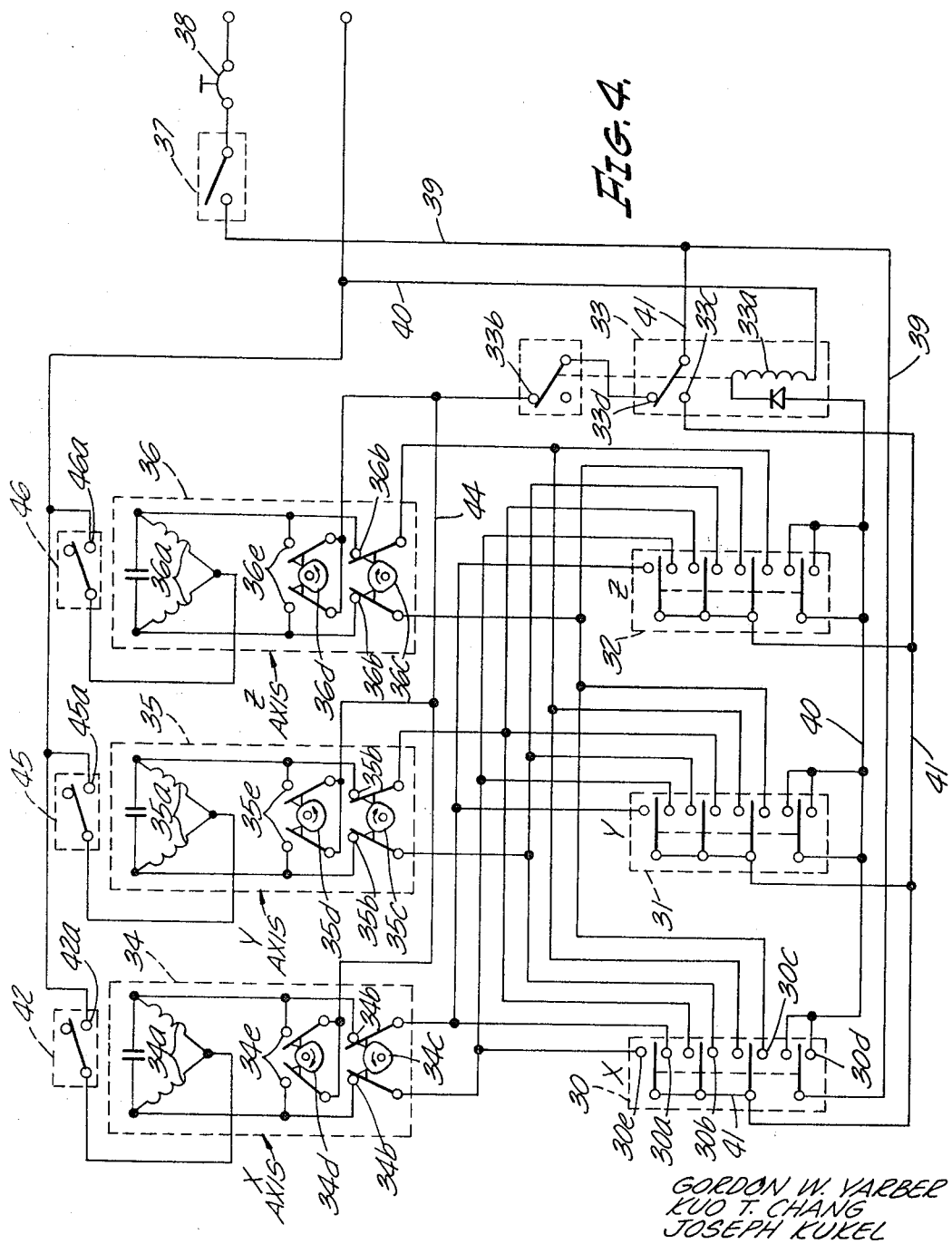

United States Patent Office 3,452,948
Patented July 1, 1969

3,452,948
SYSTEM AND METHOD FOR FREE BODY STABILIZATION AND ORIENTATION
Joseph Kukel, Palos Verdes Peninsula, Kuo T. Chang, Redondo Beach, and Gordon W. Yarber, Malibu, Calif., assignors to The Garrett Corporation, Los Angeles, Calif., a corporation of California
Filed Jan. 3, 1967, Ser. No. 606,695
Int. Cl. B64g 1/00; G01c 19/00
U.S. Cl. 244—1          13 Claims

ABSTRACT OF THE DISCLOSURE

A space stabilization and orientation system and method employing control moment gimbaled gyroscopes for momentum transfer to and from a free body maneuvering in space.

---

If free bodies are to maneuver in space, it is essential that suitable provisions be made both for their orientation and stabilization. Where such body is an astronaut, for example, he must be able to control his orientation with respect to the work he wishes to undertake and be able to stabilize himself should he undergo body tumbling. Further, the astronaut must have available to him a reactive force which will permit his use of space tools and equipment transfer in the course of space work. It is also important that this force be sufficient to permit him to apply sufficient force to structures to accomplish connections and disconnections. The invention is obviously not limited in application to astronauts, but is adapted to handling a variety of free bodies in space where stabilization and orientation are requirements.

The control force for accomplishing the aforementioned objectives can be obtained either internally, as by reacting against an on-board component such as a control moment gyroscope (CMG) or an inertia flywheel or externally, e.g., through the use of jet thrusters arranged to produce a thruster couple. The relative merits of these approaches depend upon such factors as duration of the mission, precision and extent of control required and the frequency and nature of the anticipated forces.

The inertia flywheel is relatively heavy for the torque produced, when compared with control moment gyroscopes or momentum wheels. The working efficiency is low since most of the power goes into the flywheel instead of the astronaut during the time of producing torque by rotational speed change.

Jet thrusters have the disadvantage of requiring mass to be expelled at high relative velocities and with very low working efficiency, fuel being expended in direct proportion to the momentum impulse exerted on the body. Misalignment of a thruster couple about the center of mass of the astronaut and the maneuvering unit will cause translation which may be undesirable.

This invention employs gimbal mounted momentum wheels or control moment gyroscopes (CMG) for controlling the rotary motion of the astronaut or other body with reference to its three principal axes and serving as a source of reactive gyroscopic torque. These wheels have exceptional performance characteristics which effect the transfer of angular momentum between the gyroscopes and the free body with negligible expenditure of energy. Free body tumbling is prevented or stopped without the use of a complex control system. Thus, simply by uncaging the control moment gyros the free body's angular momentum is transferred thereto and the body's kinetic energy absorbed in the gimbal dampers. Free body orientation is accomplished with precision and with a high degree of efficiency, approaching 100%, through utilization of a very simple gimbal actuating system. The translational motion of the free body is unaffected by any control action of the control moment gyro since it is impossible for the gyroscope to develop translational forces. The system of this invention can be used in conjunction with thrusters and when so employed, the invention will hold the free body in a fixed orientation during linear translation by the thrusters even though the thrusters may be misaligned with respect to the center of mass of the free body and the associated maneuvering unit. However, unlike the thrusters, the control moment gyroscopes employed by this invention produce no effect on the motion of center of mass during attitude control since they are incapable of developing any translational force. The control moment gyroscopes may be assisted in stabilizing a tumbling free body by the thrusters, where the required resistive torque exceeds gyroscope saturation. In such case the thrusters may be fired for the purpose of desaturating the control moment gyroscopes.

As indicated above, it is an object of this invention to provide a system and method for the orientation and stabilization of a free body, particularly an astronaut called upon to perform extra-vehicular missions.

It is another object of this invention to provide a highly reliable system, as described, which operates with a high degree of efficiency and precision; is light in weight and of small volume; and which requires a minimum of fuel for operation.

Still another object is to provide a system and method for free body control employing control moment gyros, which system is substantially free of cross coupling effects and the operation of which is subject to simple and effective control.

A further object is the provision of a control system for a free body which employs a minimum number of control moment gyros oriented to the free body principal axes to provide for simple and effective rotation of the spin axes and resultant movement of the free body about all three of its principal axes.

Still a further object of the invention is to provide the above described system and method for control of the attitude and for the stabilization of a free body, which may be effectively employed in conjunction with thrusters.

Other objects and advantages of this invention will become apparent from the following descriptions and drawings in which:

FIG. 4 is a general schematic showing of the invention with associated control panel and circuitry.

The invention makes use of the control moment gyroscope (CMG), a substantially constant speed device which effects the transfer of angular momentum with a minimum of power consumption. This is of obvious advantage in space applications where fuel savings and power requirements are an important consideration. The CMG or momentum wheel as employed in this invention consists of a symmetrical rotor spinning at high speed about its axis and free to rotate about one or more perpendicular (gimbal) axes. Such gyroscope provides torque to a free body during the time the direction of its spin axis or angular momentum is being changed. Stated another way, the CMG provides a source of reactive torque which in this invention is utilized in novel fashion to stop free body tumbling or to rotate the body to any desired orientation. It will be noted that the CMG is thus used is a muscle and not a sensor. However, the CMG when used in stabilizing a tumbling body serves is both a muscle and a sensor.

Briefly described, this invention in providing a source of reactive torque for stability and body rotation, employs at least three gimbaled CMG's or momentum wheels gimbaled for rotation about gimbal axes which are mutually perpendicular and which are parallel to the principle or rectangular axes of the free body undergoing control. Thus arranged, the CMG's are adapted for gimbal rotation in or closely parallel to the principal planes, i.e., those planes defined by the free body principal axes. Although not limited to the following arrangement, power and control means are considerably simplified where the control moment gyroscopes have equal angular momentum; the gyroscopes are single gimbal mounted; and the gyroscope assembly angular null position is fixed with the gyro spin axes at 45° to the principal axes of the free body and at 60° to each other. Through such arrangement, rotation of the free body about any principal axis is produced by rotating two of the control moment gyroscope gimbals through equal gimbal angles in one direction and by rotating the third control moment gyroscope gimbal through an equal such gimbal angle, but in an opposite direction. To provide free body stability against tumbling, the control moment gyroscopes are simply uncaged to provide, within their limits, a countering reactive torque, which may be supplemented by jet thrusters, as heretofore indicated.

Figure 1:
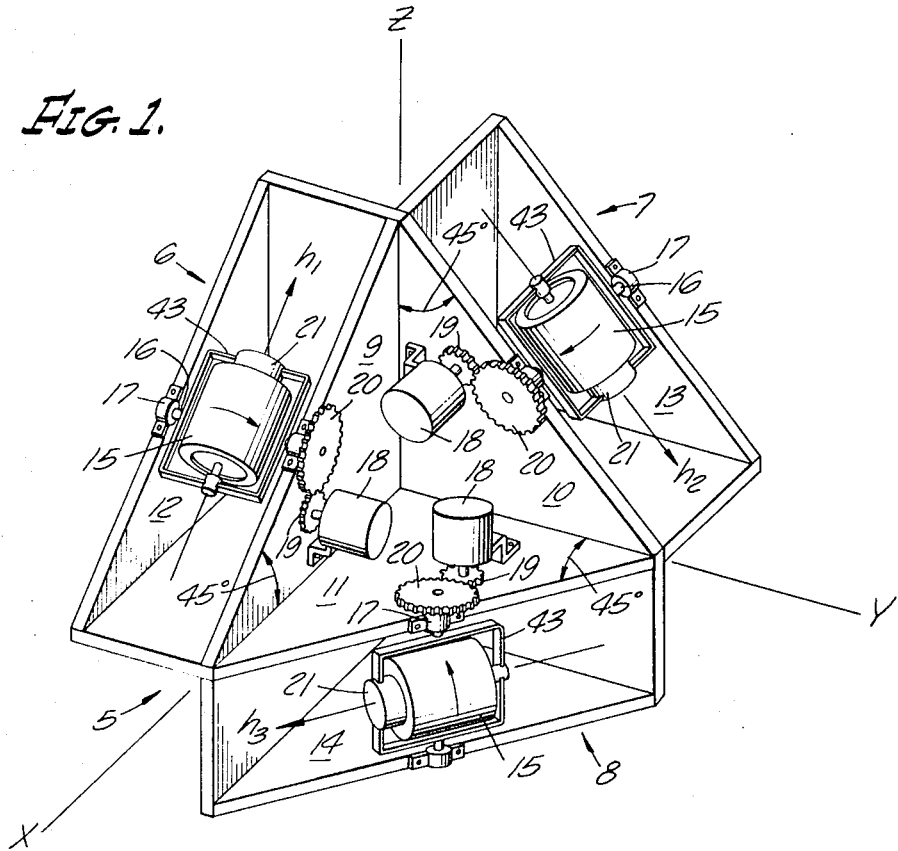
FIG. 1 is an isometric view illustrating a preferred-embodiment of the invention employing three control moment gyroscopes oriented to the principal axes of a free body.

Turning now to the drawings, in FIG. 1 there are shown the three principal axes, X, Y, and Z of a free body 5 which may, for example, be an astronaut engaged in extra-vehicular activity or some other free body such as a spacecraft in space. Support structures 6, 7, and 8 are respectively bounded by front members 9, 10, and 11 and rear members 12, 13, and 14, which members define cavities for the reception of control moment gyroscopes 15. The gyroscopes are carried upon gimbal shafts 16 and preferably are balanced with their centers of mass in the center lines of the gimbal axes, which latter are coincident with the longitudinal axes of shafts 16. Shafts 16 are preferably carried in low torque instrument bearings (not shown) positioned in bosses 17 located upon support structure. The gimbal axes are orthogonal and parallel to the principal axes X, Y, and Z of the free body 5 which arrangement permits the spin axes of the gyroscopes to be rotated substantially within the principal planes defined by these principal axes. The position and rate of movement of the spin axes of the gyroscopes 15 are controlled by gimbal actuators or torque motors 18 which drive the control moment gyroscopes in rotation about their gimbal axes through interengaged gears 19 and 20.

The control moment gyroscopes 15 are each driven in rotation about their spin axes by motors 21 to develop angular momentums, respectively indicated as $h_1$, $h_2$, and $h_3$. Although a variety of motors may be employed, a brushless D-C motor is particularly suitable. Where associated with a maneuvering astronaut, the control moment gyroscope wheels may, for example, be sized about 15 ft.-lb.-sec. at 53,000 r.p.m. The motor in such case should preferably be of sufficient size to provide acceleration from zero speed to operating r.p.m. in about 20 minutes and pressure inside the motor housing should be sufficiently low, e.g., 10 to 50 microns, to reduce windage loss. A space vacuum condition should not, however, be maintained in the bearings.

Figure 2:
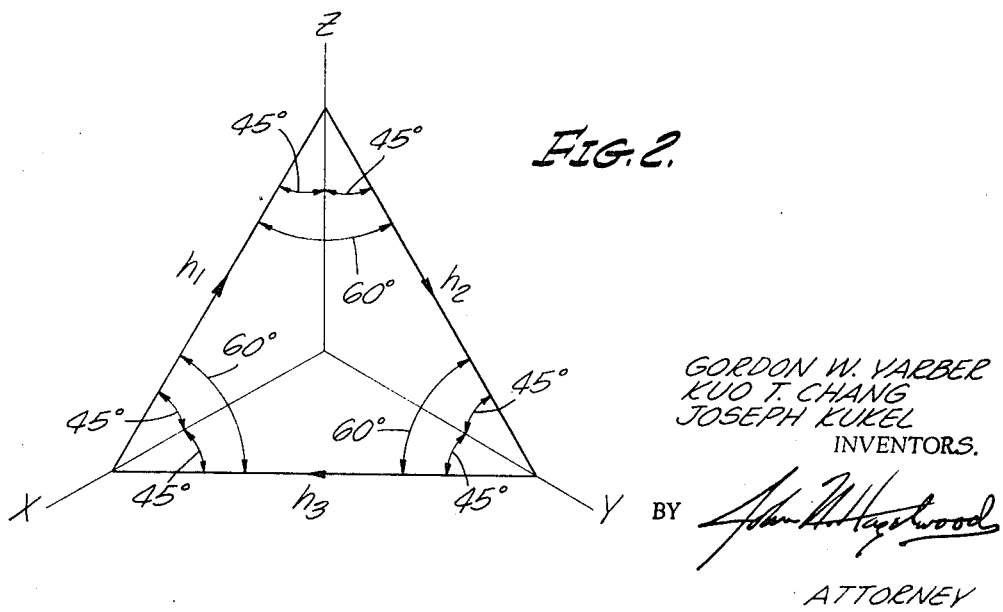
FIG. 2 is a vector diagram representation of the invention embodiment of FIG. 1 showing the null position, at which the vector sum of the angular momenta of the gyroscopes is zero.

In FIG. 2 the angular momentums $h_1$, $h_2$, and $h_3$ representative of gyroscopes 15 are assumed to be equal, a preferred arrangement as heretofore indicated, and are shown by way of vectors irented to the principal axes X, Y, and Z of the free body 5. When the gyroscope angular momentums are equal, as illustrated, the null position for the gyroscope assembly, i.e., the position whereat the vector sum of gyroscopic angular momenta is zero, is with the gyroscope spin axes at angles of 45° with the respective principal axes and at angles of 60° with each other, as is shown in FIG. 2. This null position is the initial or uncaged position for the gyroscopes from which the gyroscopes operate to restrain the tumbling of the free body and operate in conjunction with the torquers 18 to effect rotation of the body relative to inertial space. When the angular momentums of the gyroscopes 15 are equal, with the null position as described, the control system is considerably simplified, as hereinbelow described.

The following is a mathematical analysis of the gyroscope assembly of FIG. 1, wherein the three, single-gimbal mounted control moment gyroscopes are mounted with their spin axes in the respective principal planes of the free body and with their gimbal axes orthogonal, each gimbal axis being parallel to a principal axis of the free body. This arrangement permits rotation of the gyroscope spin axes in the principal planes of the free body. The basic equations for the angular momentums which can be developed are set forth below.

Let $H_x$, $H_y$, and $H_z$ be the angular momentums about the X, Y, and Z axes, and $\xi$, $\zeta$, $\psi$, the angles made by the momentum vectors $h_1$, $h_2$, and $h_3$ with the X, Z, and Y axes.

$$H_x = h_3 \sin \psi - h_1 \cos \xi$$
$$H_y = h_2 \sin \zeta - h_3 \cos \psi$$
$$H_z = h_1 \sin \xi - h_2 \cos \zeta$$

By substitution, $$H_x = h_3 \sin (45° \pm \phi_3) - h_1 \cos (45° \pm \phi_1)$$
$$H_y = h_2 \sin (45° \pm \phi_2) - h_3 \cos (45° \pm \phi_3)$$
$$H_z = h_1 \sin (45° \pm \phi_1) - h_2 \cos (45° \pm \phi_2)$$

By further substitution from the fundamental identities and by making $h_1 = h_2 = h_3 = h$, then $$H_x = \frac{\sqrt{2}}{2} h [(\cos \phi_3 \pm \sin \phi_3) - (\cos \phi_1 \pm \sin \phi_1)]$$

$$H_y = \frac{\sqrt{2}}{2} h [(\cos \phi_2 \pm \sin \phi_2) - (\cos \phi_3 \pm \sin \phi_3)]$$

$$H_z = \frac{\sqrt{2}}{2} h [(\cos \phi_1 \pm \sin \phi_1) - (\cos \phi_2 \pm \sin \phi_2)]$$

The total angular momentum ($H_T$) is expressed by the equation, $$H_T = \sqrt{(H_x)^2 + (H_y)^2 + (H_z)^2}$$

$$H_T = h \sqrt{\frac{3 + \sin (\phi_1 - \phi_3) - \cos (\phi_1 + \phi_3) + \sin (\phi_3 - \phi_2) -}{\cos (\phi_3 + \phi_2) + \sin (\phi_2 - \phi_1) - \cos (\phi_2 + \phi_1)}}$$

Figure 3:
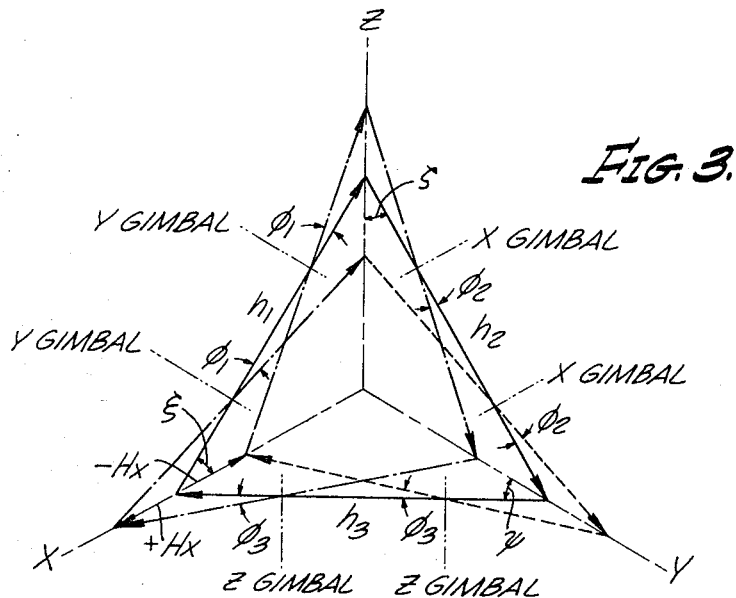
FIG. 3 is a vector diagram similarly representative of the embodiment of FIG. 1 and showing angular movement of the gyro spin axis from position neutral.

In FIG. 3, the solid line vectors identifying the gyroscope angular momentums are similar to those of FIG. 2. However, there are additionally shown by way of vector representation both positive and negative changes in the total angular momentum of the gyro assembly from the position of FIG. 2. By positive change is meant an increase in angular momentum from origin to the point of vector intercept with the axis, as is the case with the X-axis intercept of the dot-dash vector representation. The opposite or negative change, is shown by intercept of the X-axis by the dash line vectors.

With $h = h_1 = h_2 = h_3$, $$H_x = h (\cos \xi - \sin \psi)$$

$$\xi = 45 \pm \phi$$

$$\psi = 45 \pm \phi$$

When $\xi$ and $\psi$ are less than 45°, $H_x$ is positive in the sense above indicated.

When $\xi$ and $\psi=45°$, $H_x$ is negative in a similar such sense.

$$H_x = h(\cos(45\pm\phi) - \sin(45\pm\phi))$$
$$= h_2 \sin 45 \sin \phi$$
$$= 1.4142h \sin \phi$$

A similar such mathematical relationship can be expressed for the Y and Z-axes.

The angular momentum developed about each principal axis is determined below. Selecting the X axis as typical, torque is applied to this axis. The dot symbols (·) used below are shorthand expressions for the time differential of the quantity involved.

$$T_{o_x} = \frac{dH_x}{dt} = h\frac{d}{dt}(\cos \xi - \sin \psi) = -h(\dot{\xi}\sin\xi + \dot{\psi}\cos\psi)$$

Torque about Y-axis is zero. Thus, $$T_{o_y} = 0 = \frac{dH_y}{dt} = h\frac{d}{dt}(\sin\xi - \cos\psi) = h(\dot{\xi}\cos\xi + \dot{\psi}\sin\psi) = 0$$

Similarly, torque about the Z-axis is zero. Hence $$T_{o_z} = 0 = \frac{dH_z}{dt} = h\frac{d}{dt}(\sin\xi - \cos\zeta) = h(\dot{\xi}\cos\xi + \dot{\zeta}\sin\zeta) = 0$$

The torque that can be developed about any axis is:

$$T_o = \frac{dH}{dt} = -1.4142h\frac{d}{dt}\sin\phi = -1.4142h\dot{\phi}\cos\phi$$

$$H_x = -1.4142h \sin\phi;\ H_y=0;\ H_z=0$$

Study of the angular momentum and torque equations reveals that control about a single axis may be accomplished by letting $\phi_1$, $\phi_2$ and $\phi_3$ be numerically equal. By choosing one angular motion to be opposite in direction sign to the other two, control will be about a principal axis. Thus, to control about any one axis, the control method is to rotate the gimbal axis which is parallel to that particular axis, in a direction opposite the direction of rotation of the other two orthogonal axes, but through an equal angle $\phi$.

Let $-\phi_1=\phi_2=\phi_3=\phi$, $H_x=\sqrt{2h \sin\phi}$, $H_y=0$; $H_z=0$.

Let $\phi_1=-\phi_2=\phi_3=\phi$, $H_y=\sqrt{2h \sin\phi}$, $H_x=0$; $H_z=0$.

Let $\phi_1=\phi_2=-\phi_3=\phi$, $H_z=\sqrt{2h \sin\phi}$, $H_x=0$; $H_y=0$.

However, note if $\phi_1=\phi_2=\phi_3=\phi$, $H_x=\sqrt{2h \sin\phi}$, $H_y=\sqrt{2h \sin\phi}$, $H_z=\sqrt{2h \sin\phi}$, $H_{Tot.}=\sqrt{6h \sin\phi}$.

When all three angular momentum vectors are in a single principal plane, and the one momentum wheel or control moment gyroscope free to move in this plane is moved through an angle the angular momentum ($H_t$) developed is expressed by the following equation:

$$H_t = h\sqrt{3+2\sqrt{2}\sin\phi}$$

The torque ($T_o$) that may be developed about any principal axis is expressed in the following equation: (one angle $\phi$ is opposite in sign to the other two).

$$T_o = \sqrt{2}h\dot{\phi}\cos\phi$$

When the gimbal rate $\dot{\phi}$ is held constant, the maximum torque ($T_o$) that can be developed is when $$\phi_1=\phi_2=\phi_3=\phi$$

Then, $T_o = \sqrt{6h}\ \dot{\phi}\cos\phi$.

Using the preceding torque equations the torques associated with control about a principal axis are as follows:

When $-\phi=\phi_2=\phi_3=\phi_1$ then $T_{ox}=\sqrt{2h}\ \dot{\phi}\cos\phi$; $T_{oy}=0$; $T_{oz}=0$.

Thus, all cross coupling is eliminated with control only about a principal axis.

Similarly, when $\phi_1=-\phi_2=\phi_3=\phi$, then $T_{oy}=\sqrt{2h}\dot{\phi}\cos\phi$; $T_{ox}=0$; $T_{oz}=0$; when $\phi_1=\phi_2=-\phi_3=\phi$, then $T_{oz}=\sqrt{2h}\dot{\phi}\cos\phi$; $T_{ox}=0$; $T_{oy}=0$.

For a given combination of gimbal angles, there is a well defined relationship between the torque applied to a free body and the gimbal angular rates of a CMG. The angular rates can be used as input to produce the control torques, or the torques can be applied as input with the gimbal angular rates as output.

Rotation about each gimbal axis is controlled by actuator motors 18 which drive the gimbals at a predetermined rate. The advantage in this method lies in the very large torque gain attainable, i.e., a small drive motor can produce a reaction torque perhaps several hundred times in magnitude. Also, the so-called "bind up" of an axis cannot occur, unless the control moment gyroscope has already been driven to the saturation point.

Figure 5:
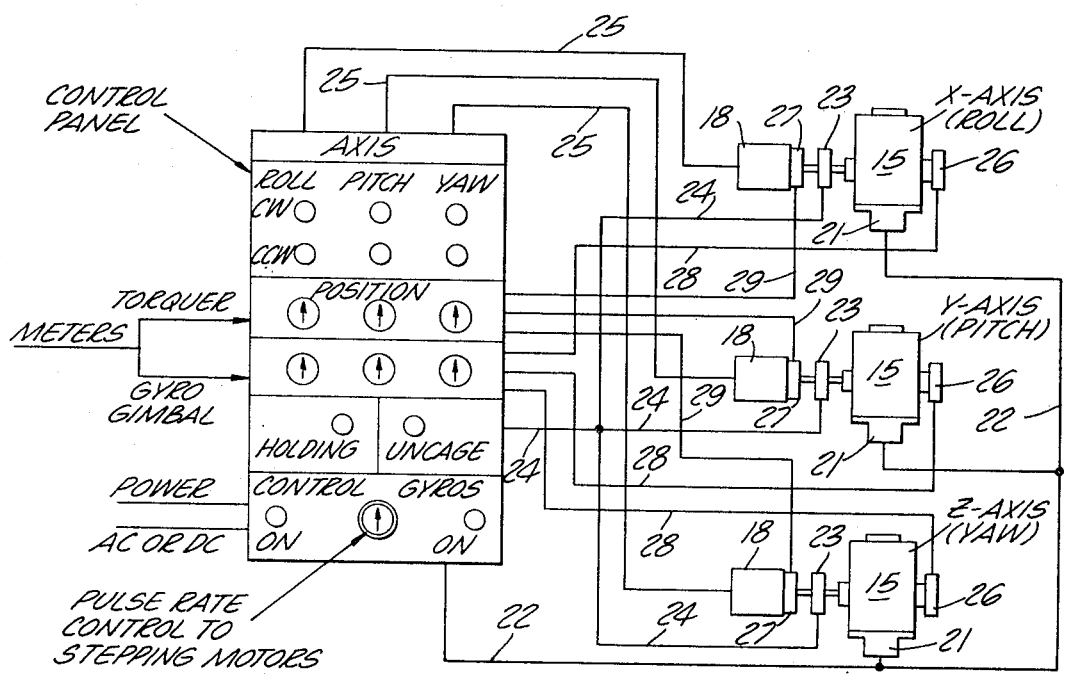
FIG. 5 is a schematic showing of a manual control system employed to position the free body through gimbal movement of the gyro spin axes.

As shown schematically in FIG. 5, the control system presents a variety of command options to control free body orientation. Assuming for purposes of illustration, that the free body is a maneuvering astronaut, the control panel may be conveniently incorporated in a unit (not shown) secured at the front of the astronaut about his waist, and hence conveniently available for control and for position monitoring. Spin motors 21 are energized through an on-off switch and conductors 22 to effect rotation of gyroscopes 15 about their spin axes. The caging or holding of gyroscopes 15 is by means of clutches 23 which are controlled through holding and uncage switches and conductors 24.

Rotation about the X, Y, and Z axes is designated respectively on the control panel as roll, pitch and yaw and is manually controlled for clockwise or counterclockwise movement through the press-to-actuate switches on the control panel which through conductors 25 energize the actuators 18, the latter shown in FIG. 5 to be stepping motors with pulse control. Visual position monitoring is provided for through gimbal position potentiometers 26 and torquer position potentiometers 27 which respectively provide signals to position-indicating dials via conductors 28 and 29.

In FIG. 4 there is shown the system wiring diagram for energization of the gimbal actuators 18, which latter incorporate split phase A-C motors rather than the stepping motors of the FIG. 5 system. The A-C motors of FIG. 4 may, like the stepping motors of FIG. 5, move as a function of the pulse rate, however, the A-C motors would not move in the discrete steps which characterize the stepping motors. Both the A-C and stepping motors are satisfactory for accomplishing gimbal rotation and resultant free body orientation.

As mentioned with regard to FIG. 5, the switches for control of the system of FIG. 4 can, when concern is with astronaut control, be located in a unit (not shown) convenient for manual operation, as at the waist of the astronaut. The system shown in FIG. 4 is designed to permit the astronaut operator to position himself or other controlled free body simply by pushing one switch identifying the direction in which motion is desired and manually maintaining the switch in circuit-energizing position until the desired movement is accomplished. It will be noted that the circuitry is so arranged that a call for control about the X-axis, for example, will effect similar rotation of the Y and Z gyros about their gimbal axes, but in an opposite direction. Although an open loop control system is illustrated, a closed loop system can be employed to accomplish a similar function.

The FIG. 4 control system is designed for operation with three gyroscopes having substantially equal angular momentums, arranged in a gyroscope assembly, as shown in FIG. 1. As heretofore indicated, this arrangement is adapted to a particularly simple, effective, reliable and economic means of control. Thus, the FIG. 4 system incorporates three manually operated, ganged, contact switches, 30, 31, and 32, and a solenoid-actuated relay 33 having a pair of ganged contacts. Relay 33, which is biased to assume the nonactuated position of FIG. 4, serves to synchronize the energization of the X, Y, and Z gimbal drive motors through limit and return switch and winding units 34, 35, and 36, which respectively energize the three capacitor gimbal motors, effecting gimbal rotation about the X, Y, and Z axes.

Assuming that free body movement is desired, for example, in a counterclockwise direction about the X-axis, the main power switch 37 is manually closed to provide for system energization through circuit breaker 38 and conductor 39. Switch 30 is similarly manually operated to move ganged switching elements downwardly for circuit closure through contacts 30a, 30b, 30c, and 30d. With closure of contact 30d, solenoid 33a of relay 33 is energized through conductor 40, causing its ganged switching elements to close upon contacts 33b and 33c, thus energizing conductor 41. The contact 30d is designed slightly to lag contacts 30a, 30b, and 30c in closure thereby to operate in conjunction with switch 33 to assure simultaneous energization of the three gimbal drive motors, even though some variation may occur in the timing of closure of the individual contacts of switch 30.

Upon closure of contacts 30a X-gimbal motor windings 34a are energized through the right hand limit switch contact 34b, which is shown closed through a switching element actuated by cam 34c, and through manually operated switch 42, the switching element of which latter is manually closed through contact 42a. Both this cam and the cam 34d of the second limit switch, the latter of whose contacts 34e are shown open, rotate with the gimbal shaft 16 of the X-axis control moment gyro to accurately reflect rotation of the gyro gimbal ring stators 43. For the arbitrarily selected counterclockwise rotation, the cams 34c and 34d rotate in the direction indicated by the arrows. As shown in FIG. 4, the limit switches, as well as the remaining system switches, are in neutral positions with the control moment gyroscopes 15 in the null or neutral position of FIG. 1. The cam 34c serves to limit gimbal rotation to a figure below 90°, effectively acting against gyroscope bindup. Cam 34d serves a returning function permitting the gimbal to rotate back or in the reverse of its actuated position, bypassing the open contacts 34b of the limit switch and energizing the X-axis gimbal motor winding through switch 33, as presently explained.

As the X-axis gimbal actuator coil 34a is energized, the motor drives the gimbal in rotation about the X-axis, at the same time rotating cam 34d and 34c as indicated. The latter cam at a position short of 90° rotation disengages the switching elements from contacts 34b, deenergizing the X-axis gimbal actuator coil 34a. Cam 34d at the same time has rotated to move its associated switching elements into closure through contacts 34e, thus energizing the coil 34a for rotating the gimbal actuator motor in the opposite or return direction. For such return, switch 30 is moved to the neutral position of FIG. 4, deenergizing coil 33a of relay 33, which permits return of the biased switching element to its original position shown in FIG. 4. Energization of the motor coil 34a is then effected through contact 34e, conductor 44, contacts 33b and 33d, and conductor 41. Rotation of cam 34d will again open the switch contacts 34e as the gimbal reaches its neutral or starting position for repetition of the operation sequence.

At the same time as the X-axis motor is energized to move through a particular angle either away from or toward its neutral position by manual operation of switch 30, the Y and Z-axis gimbal motors are respectively energized through contacts 30b and 30c to move in an opposite direction and through a similar such angle. This is apparent from the cam rotation arrows and observation of the energization of the Y and Z-axis gimbal motor coils. Thus energization of the Y-axis gimbal motor coil 35a is through contact 30b, left hand limit switch contact 35b, closed through a switching element actuated by cam 35c, and through manually operated switch 45 and its contact 45a. Similarly, the Z-axis gimbal motor coil 36a is energized through contact 30c, left hand limit switch contact 36b, actuated by cam 36c, and through a manually operated switch 46 and its contact 46a. Operation of the cam actuated limit and return switches through contacts 35b, 35e and 36b, 36e is similar to that indicated for the X-axis gimbal motor and need not be repeated.

It is evident that if rotation of the X-axis gimbal motor is desired in an opposite or clockwise direction of rotation, the ganged elements of switch 30 are manually moved upwardly into a position of circuit closure by engagement with the upper contacts or those opposite the contacts just described. For example, energization of the gimbal actuator coil 34a is accomplished through switch upper contact 30e, left hand limit switch contact 34b, closed by cam 34c, and manually closed switch contact 42a. Return to the neutral position is accomplished through left hand return switch contact 34e in the same manner as previously indicated for rotation of the X-axis gimbal motor for counterclockwise rotation. Again, gimbal rotation of similar extent but opposite direction, is accomplished by simultaneous energization of the Y and Z-axis gimbal motors which utilize like circuitry in returning the gimbals to the neutral position. If simultaneous gimbal rotation is not desired, energization of any selected gimbal motor may be broken by opening its associated grounding switch 42, 45, or 46. This may be necessary on occasion for synchronizing the positions of the three gyroscopes.

Rotation about either the Y-axis or the Z-axis is accomplished in a fashion similar to that described for the X-axis, utilizing manually operated ganged switches 31 or 32, cam actuated limit and return switches of units 35 or 36, and manually actuated grounding switches 45 or 46. Accordingly, a description of the operation of these circuits need not be repeated. Again note that the switching circuitry is arranged to energize the selected axis of rotation gimbal motor for rotation in one direction while simultaneously energizing the other two such motors for rotation of similar extent, but of opposite direction. If, however, it is desired to rotate but one or two of gimbal motors, this may be accomplished by selected closure of the grounding switches 42, 45 and 46, as previously indicated.

From the foregoing, it is apparent that the control system of FIG. 4 permits rotation of the free body about any one selected principal axis without any cross-coupling effects. With appropriate switch actuation, the gimbals are rotated at equal rates and through equal angles, but the one gimbal parallel to the axis about which control is desired is rotated in a direction opposite to the other two gimbals. The operator can control the extent and direction of rotation by closing and opening the switch contacts until the desired position, indicated on the FIG. 5 control panel, is reached. The amount of angular momentum transferred to the free body is a function of the gimbal angle $\phi$ relative to its neutral position. The angular momentum (H) along a principal axis is expressed by the equation:

$$H = \sqrt{2h} \sin \phi$$

where $h$ = angular momentum of each wheel.

The torque produced about a principal axis while the gimbals are being rotated through angle $\phi$ in either direction, at $\dot{\phi}$ rate, is expressed by the equation:

$$T_o = \sqrt{2h} \dot{\phi} \cos \phi$$

Referring again to FIG. 5, the free body may be stabilized simply by actuation of the holding switch on the control panel which uncages the gyroscopes from their holding or null position of FIG. 4. Upon uncaging, the angular momentum of the free body will be transferred quickly to the control moment gyroscope assembly within its saturation capacity limits and the kinetic energy will be dissipated by electric dynamic damping provided by the gimbal actuators, as hereinafter described. The three-axis configuration of FIG. 1 can absorb angular momentum up to 82% of magnitude of the angular momentums of all three control moment gyroscopes 15, which is higher than any other single gimbal configuration which can provide equal 3-axis control.

Stabilization control can be considered a passive control since no control logic or additional sensing system is required. Once the gyroscopes 15 are uncaged, their own gyroscopic couple from the angular motion of the free body provides the torque required to rotate the gimbal axes against the damping torque provided in the actuator circuit. Thus, it should be noted that when a stabilization control switch uncages the gyros, the gimbal actuators act as electrical generators with an output proportional to gimbal rate. Damping resistors may also be utilized and switched across the actuators to assist in absorbing the kinetic energy of the free body. Gimbal rotation will continue until all angular momentum within the capacity of the control moment gyroscope assembly has been transferred from the free body to the control moment gyroscopes 15 and until all kinetic energy associated with the momentum exchange has been dissipated through gimbal damping. Thrusters may be used as backup means where angular momentum requirements exceed the capacity of the gyroscope assembly.

The gimbal drive motors or torquers 18 may be constructed to provide smooth electromagnetic damping torque proportional to the angular velocity of the gimbal axis. The free body angular motion will be brought to zero when the angular momentum has been transferred to the CMG assembly and the kinetic energy has been dissipated through gimbal damping. The damping required is equal to the kinetic energy of the free body, which is stated, $$K.E. = \tfrac{1}{2} I_v w_v^2$$
$$= \tfrac{1}{2} H_t w_v (H_t = \sqrt{6}h)$$
$$= \frac{\sqrt{6}}{2} h W_v$$

This damping is required to prevent the continual transfer of energy from the free body 5 to the CMG assembly mass and back again in a cyclic manner. The damping also provides sufficient cross-coupling to prevent gimbal lockup. Within the angular momentum capacity of the CMG, motion of the free body will cause rotary motion in one or more gimbal axes until the angular kinetic energy of the astronaut is completely dissipated. Passive modes of vehicle motion control are attractive from the standpoint of simplicity in control logic and high reliability. It is important to consider the principle of minimum kinetic energy when the feasibility and effectiveness of such control to particular applications need be assessed.

The principle may be stated, among all possible states of (rotational) motion of a system corresponding to a given invariant angular momentum vector, the actually occurring state is that which possesses the minimum amount of kinetic energy, provided, of course, that a means of energy dissipation exists within the dynamic system.

Consider an application of this principle to an astronaut who finds himself tumbling in space due to an unforseen application of torque. If the astronaut has lost orientation, control thrusters are ineffective unless elaborate sensing and computing devices are carried with the astronaut to program the thruster firing. This tumbling can be stopped, and without the use of active control, if the angular momentum of the astronaut's body rotation can be transferred to a CMG system, as in the case of the present invention, which originally has the gimbals locked up so that the net resultant angular momentum is zero. By uncaging the gimbal axes, and introducing damping into the gimbal bearings, the CMG will passively accomplish the desired control since, according to the aforementioned energy principle, the kinetic energy of the constant speed wheels remains the same before and after uncaging, however, the kinetic energy of body rotation will be dissipated in order to arrive at the lowest energy level compatible with constant angular momentum.

What is claimed is:
1. A gyroscopic system for the control of a free body comprising in combination:
   at least three control moment gyroscopes, each having angular momentum about its spin axis;
   means mounting said gyroscopes for gimbal movement about orthogonal axes each parallel to a respective principal axis of the free body whereby to maintain the spin axis of each of the gyroscopes substantially parallel to the respective principal planes defined by the other principal axes of the free body;
   means for holding said gyroscopes in a neutral position wherat the vector sum of gyroscopic momenta is zero with each gyroscopic momentum vector possessing two components in two principal axis direction; and
   control means for coordinatedly transferring angular momentum between said gyroscopes and the free body.

2. The gyroscopic system of claim 1, wherein said control means includes actuating means for effecting orientation of the free body by transferring gyroscopic angular momentum thereto.

3. The gyroscopic system of claim 1, wherein said control means includes means for releasably caging said gyroscopes whereby upon caging release free body angular momentum is transferred to the gyroscopes for free body stabilization.

4. A gyroscopic system for the control of a free body, comprising in combination:
   three control moment gyroscopes having substantially equal angular momentums about their respective spin axes;
   means mounting said gyroscopes for gimbal movement about orthogonal axes each parallel to a respective principal axis of the free body whereby to maintain the spin axis of each of the gyroscopes substantially parallel to the respective principal planes defined by the other principal axes of the free body;
   means for holding said gyroscopes in a neutral position whereat the vector sum of gyroscopic momenta is zero and the adjacent spin axes of the gyroscopes at said neutral position are disposed at 60° angles one to the other and at 45° angles to the respective free body principal axes; and
   control means for transferring angular momentum between said gyroscopes and the free body.

5. The gyroscopic system of claim 4, wherein said control means includes means for rotating the free body about a selected principal axis by effecting rotation of the gimbals through equal angles, but with rotation of the gimbal whose axis is parallel to the axis about which rotation is desired being in a direction opposite to the direction of rotation of the other two gimbals.

6. The gyroscopic system of claim 4, wherein said control means includes means for releasing the gyroscopes from said neutral position to stabilize the free body when tumbling by means of transfer of free body angular momentum to the gyroscopes.

7. A gyroscopic system for the control of a free body, comprising in combination:
   three control mement gyroscopes having unequal angular momentums about their respective spin axes;
   means mounting said gyroscopes for gimbal movement about orthogonal axes each parallel to a respective principal axis of the free body whereby to maintain the spin axis of each of the gyroscopes substantially parallel to the respective principal planes defined by the other principal axes of the free body;
   means for holding said gyroscopes in a neutral position whereat the vector sum of the gyroscopic momenta is zero with each gyroscopic momentum vector possessing two components in two principal axis directions; and control means for coordinatedly transferring angular momentum between said gyroscopes and the free body.

8. The gyroscopic system of claim 7, wherein said control means includes actuating means for effecting orientation of the free body by transferring gyroscopic angular momentum thereto.

9. The gyroscopic system of claim 8, wherein said control means includes means for rotating the free body about a selected principal axis by effecting rotation of the gimbals through unequal angles, the inequality of said angles being a function of the inequality of the gyroscope angular momentums and wherein rotation of the gimbal whose axis is parallel to the axis about which rotation is desired is in a direction opposite to the direction of rotation of the other two gimbals.

10. The gyroscopic system of claim 7, wherein said control means includes means for releasably caging said gyroscopes whereby upon caging release, free body angular momentum is transferred to the gyroscopes for free body stabilization.

11. The method for the stabilization and orientation of a free body which comprises orienting three control moment gyroscopes with their angular momentum vectors forming a closed triangular configuration with each vector possessing two components in two principal planes and transferring the angular momentums of said gyroscopes to said free body by coordinated angular gimbal movement of the gyroscopes about orthogonal axes respectively oriented at right angles to planes defined by the principal axes of the free body.

12. The method of claim 11, wherein the gyroscopes have substantially equal angular momentums and whereby controlled rotation of the free body about a selected principal axis is accomplished by substantially equal angular gimbal movement of the gyroscopes, but with movement of the gimbal whose axis is parallel to the selected principal axis of the free body being opposite in direction to movement of the other two gimbals.

13. The method of claim 12, wherein said orienting includes locating the respective apexes of the closed triangular configuration substantially on the principal axes of the free body.

References Cited
UNITED STATES PATENTS 3,158,340  11/1964  Sellers _____ 244—79

FERGUS S. MIDDLETON, *Primary Examiner.*

U.S. Cl. X.R.

74—5.34; 244—3.19, 79